US009321927B2

(12) United States Patent
Allison et al.

(10) Patent No.: US 9,321,927 B2
(45) Date of Patent: Apr. 26, 2016

(54) ENHANCED WASHABILITY INKS AND METHODS OF MAKING THE SAME

(71) Applicant: Crayola LLC, Easton, PA (US)

(72) Inventors: Keith Allison, Blandon, PA (US); Craig Skinner, Easton, PA (US)

(73) Assignee: Crayola LLC, Easton, PA (US)

( * ) Notice: Subject to any disclaimer, the term of this patent is extended or adjusted under 35 U.S.C. 154(b) by 0 days.

(21) Appl. No.: 14/192,246

(22) Filed: Feb. 27, 2014

(65) Prior Publication Data

US 2014/0242286 A1 Aug. 28, 2014

Related U.S. Application Data

(60) Provisional application No. 61/769,985, filed on Feb. 27, 2013, provisional application No. 61/777,609, filed on Mar. 12, 2013.

(51) Int. Cl.
| | | |
|---|---|---|
| *C09D 11/02* | (2014.01) | |
| *C09D 11/16* | (2014.01) | |
| *B05D 1/28* | (2006.01) | |
| *D06F 35/00* | (2006.01) | |
| *C09D 11/14* | (2006.01) | |

(52) U.S. Cl.
CPC ........ *C09D 11/16* (2013.01); *B05D 1/28* (2013.01); *C09D 11/14* (2013.01); *D06F 35/00* (2013.01)

(58) Field of Classification Search
CPC ........ C09D 11/00; C09D 11/02; C09D 11/03; C09D 11/16
See application file for complete search history.

(56) References Cited

U.S. PATENT DOCUMENTS

| 4,838,938 A | 6/1989 | Tomida |
| 4,981,516 A | 1/1991 | Kluger |
| 5,043,013 A | 8/1991 | Kluger |
| 5,108,505 A | 4/1992 | Moffatt |

(Continued)

FOREIGN PATENT DOCUMENTS

| DE | 102007051279 | 4/2009 |
| EP | 0557115 | 8/1993 |

(Continued)

OTHER PUBLICATIONS

Notification of Transmittal of the International Search Report and the Written Opinion of the International Searching Authority, or the Declaration Issued for Application No. PCT/US2014/018956 Dated May 22, 2014.

(Continued)

*Primary Examiner* — Veronica F Faison
(74) *Attorney, Agent, or Firm* — RatnerPrestia

(57) ABSTRACT

An enhanced washability ink composition has enhanced rinsability and/or washability from fabric, walls, or skin. The composition may comprise about 70 wt % to about 95 wt % water; about 5 wt % to about 35 wt % one or more sugars (e.g., dextrins); about 1 wt % to about 40 wt % one or more optional dye blockers; about 0.1 wt % to about 15 wt % one or more dyes; and one or more optional additives. The rinsable ink composition is usable in a variety of instruments, including markers or pens. A method for making the rinsable ink composition comprises dissolving one or more sugars (e.g., dextrins) in water to form a sugar solution; subsequently adding one or more dyes to the sugar solution to form a sugar-dye solution; and subsequently adding one or more optional dye blockers to the sugar-dye solution.

19 Claims, 1 Drawing Sheet

(56) References Cited

U.S. PATENT DOCUMENTS

| | | |
|---|---|---|
| 5,116,410 A | 5/1992 | Miller |
| 5,241,059 A | 8/1993 | Yoshinaga |
| 5,302,195 A | 4/1994 | Helbrecht |
| 5,486,228 A | 1/1996 | Miller |
| 5,486,550 A | 1/1996 | Lubas |
| 5,567,747 A | 10/1996 | Cappuccio |
| 5,643,356 A | 7/1997 | Nohr |
| 5,681,380 A | 10/1997 | Nohr |
| 5,700,582 A | 12/1997 | Sargeant |
| 5,735,940 A | 4/1998 | Coller |
| 5,854,320 A | 12/1998 | Nakamura et al. |
| 5,891,229 A | 4/1999 | Nohr |
| 5,900,094 A | 5/1999 | Santini |
| 5,908,495 A | 6/1999 | Nohr |
| 5,968,241 A | 10/1999 | Santini |
| 5,981,626 A | 11/1999 | Santini |
| 5,997,136 A | 12/1999 | Fujisawa et al. |
| 6,013,123 A | 1/2000 | Scarpetti |
| 6,040,359 A | 3/2000 | Santini |
| 6,124,377 A | 9/2000 | Kaiser |
| 6,168,654 B1 | 1/2001 | Nohr |
| 6,168,655 B1 | 1/2001 | Nohr |
| 6,171,381 B1 | 1/2001 | Yoshimura |
| 6,231,653 B1 | 5/2001 | Lavery |
| 6,235,095 B1 | 5/2001 | Nohr |
| 6,261,351 B1 | 7/2001 | Miyamoto |
| 6,347,851 B1 | 2/2002 | Scarpetti |
| 6,352,584 B2 | 3/2002 | VanDahm |
| 6,368,396 B1 | 4/2002 | Nohr |
| 6,372,031 B1 | 4/2002 | VanDahm |
| 6,440,535 B1 | 8/2002 | Iu |
| 6,444,021 B1 | 9/2002 | Weisbecker |
| 6,450,633 B1 | 9/2002 | Kronzer |
| 6,458,193 B1 | 10/2002 | VanDahm |
| 6,503,559 B1 | 1/2003 | Nohr |
| 6,524,379 B2 | 2/2003 | Nohr |
| 6,689,432 B2 | 2/2004 | Kitamura |
| 6,764,540 B2 | 7/2004 | Taguchi |
| 6,818,047 B2 | 11/2004 | Miyamoto |
| 7,153,356 B1 | 12/2006 | Harris |
| 7,396,400 B2 | 7/2008 | Nakamura |
| 7,402,615 B2 | 7/2008 | Johnke |
| 7,429,292 B2 | 9/2008 | McIntosh |
| 7,455,725 B2 | 11/2008 | Cordova |
| 7,815,723 B2 | 10/2010 | Li |
| 7,833,334 B2 | 11/2010 | deSaint-Romain |
| 2002/0134280 A1 | 9/2002 | Naruse |
| 2003/0021983 A1 | 1/2003 | Nohr |
| 2004/0115561 A1 | 6/2004 | Laksin |
| 2005/0011404 A1 | 1/2005 | Patel |
| 2006/0063856 A1 | 3/2006 | Cordova |
| 2006/0067896 A1 | 3/2006 | Schaffer |
| 2006/0211790 A1 | 9/2006 | Dimotakis |
| 2006/0263550 A1 | 11/2006 | Nichols |
| 2009/0021568 A1 | 1/2009 | Xu |
| 2010/0063186 A1 | 3/2010 | Onyenemezu |
| 2011/0141194 A1 | 6/2011 | Imai |
| 2013/0315980 A1 | 11/2013 | Pun |

FOREIGN PATENT DOCUMENTS

| | | |
|---|---|---|
| GB | 2234977 | 2/1991 |
| JP | 073197 | 1/1995 |
| JP | 2009263562 | 11/2009 |
| JP | 2009263563 | 11/2009 |
| WO | 9609351 | 3/1996 |
| WO | WO 98/36031 A1 | 8/1998 |
| WO | WO 00/71629 A1 | 11/2000 |
| WO | 2004053005 | 6/2004 |
| WO | 2008131158 | 10/2008 |
| WO | 2010030451 | 3/2010 |

OTHER PUBLICATIONS

Notification concerning transmittal of copy of International Preliminary Report on Patentability for International Application No. PCT/US2014/018956 mailed Sep. 11, 2015.

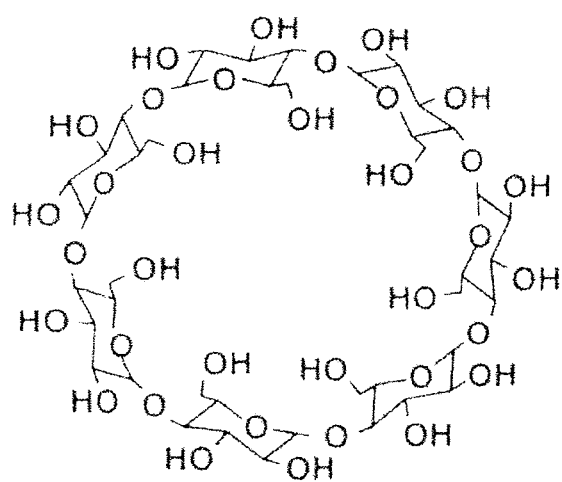
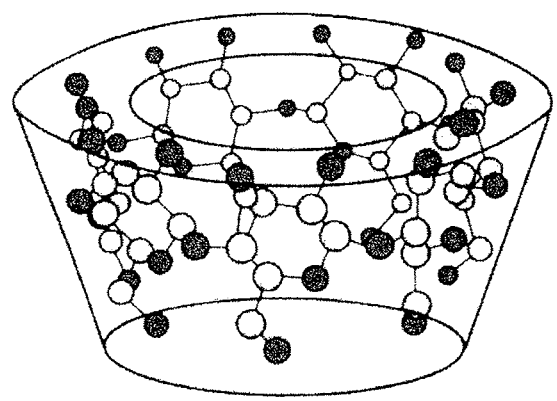

ENHANCED WASHABILITY INKS AND METHODS OF MAKING THE SAME

CROSS REFERENCE TO RELATED APPLICATIONS

This application claims the benefit of priority of U.S. Provisional Application No. 61/769,985, filed Feb. 27, 2013, and U.S. Provisional Application No. 61/777,609, filed Mar. 12, 2013, the contents of each of which are incorporated by reference herein, in their entireties and for all purposes.

FIELD OF THE INVENTION

The present invention relates generally to washable inks, and more particularly to inks that are rinsable from surfaces (e.g., cotton fabric or painted walls) without the use of soap.

BACKGROUND OF THE INVENTION

For many years, colorful markers have enabled children to use their imaginations to draw pictures of their own artistic creation. One of the challenges associated with markers is that they unintentionally create stains on many different kinds of surfaces, including clothing, furniture, floors, and walls. Some of the "washable" inks currently on the market use a combination of polymeric colorants and dye blockers to impart fabric washability to water-based marker inks. However, there remains a need for cost-efficient ink compositions that can be more easily washed or rinsed from fabric and other surfaces, while providing excellent color vibrancy and avoiding the common problem of easily "bleeding through" paper substrates.

SUMMARY OF THE INVENTION

An embodiment of the present invention provides a rinsable ink composition comprising water; one or more sugars; one or more dyes; and one or more optional additives. Non-limiting examples of the one or more sugars include monosaccharides, oligosaccharides, and polysaccharides, such as glucose, fructose, galactose, sucrose, maltose, lactose, cellulose, starch, dextrans, and dextrins (e.g., maltodextrins, cyclodextrins, etc.). The composition is substantially rinsable from painted walls and cotton fabric by applying only water (e.g., the water does not contain any surfactant or other added cleaning agent). In an exemplary embodiment, the composition is contained inside a marker.

An embodiment of the present invention provides a rinsable ink composition comprising about 70 wt % to about 95 wt % water; about 5 wt % to about 35 wt % one or more dextrins (e.g., cyclodextrins); about 0.1 wt % to about 15 wt % one or more dyes; and one or more optional additives. The composition may also optionally comprise about 1 wt % to about 40 wt % one or more dye blockers. The composition is substantially rinsable from cotton fabric by applying only water (e.g., the water does not contain any surfactant or other added cleaning agent). In an exemplary embodiment, the composition is contained inside a marker.

Another embodiment of the present invention provides a method for making a rinsable ink composition comprising dissolving one or more sugars (e.g., one or more dextrins) in water to form a sugar solution (e.g., a dextrin solution), subsequently adding one or more dyes to the sugar solution to form a sugar-dye solution, subsequently adding one or more optional dye blockers to the sugar-dye solution, and adding one or more optional additives.

BRIEF DESCRIPTION OF THE DRAWINGS

The invention may be further understood by reference to the drawing in which:

FIG. 1 illustrates the structure of one example of a suitable cyclodextrin compound for use in compositions of the present invention.

DETAILED DESCRIPTION OF THE INVENTION

The present invention provides ink compositions that can be easily rinsed from a surface, such as fabric (e.g., clothing) or walls, by using water, without needing to apply soap. The rinsable ink compositions may be used in writing utensils, such as markers and pens, and are particularly well-suited for use by children because of the inks' "non-staining" quality.

As used herein, an ink's "washability" refers to the removability of the ink from a surface (e.g., cotton fabric) with the use of water and a surfactant, such as a soap (e.g., laundry detergent). For example, an ink is "washable" from a surface if a user is able to remove colored "stains" created by the ink from the surface, particularly cotton fabric, by washing the surface with soap and water (e.g., by washing cotton fabric with soap and water, such as in a washing machine with water and laundry detergent). An ink's "rinsability" refers to the removability of the ink from a surface, such as cotton fabric, with the use of water only, such as a stream of running water or a wet sponge, and without the use of a surfactant (e.g., soap) or other cleaning agent. Thus, water that is used to rinse the ink from the surface does not contain an added surfactant or any other type of added cleaning agent. For example, an ink is "rinsable" from a surface if a user is able to remove colored "stains" created by the ink from the surface by washing the surface with water only. For example, a colored "stain" on cotton fabric may be rinsed by holding the cotton fabric under running water, by wiping the cotton fabric with a wet sponge, or by submerging the cotton fabric in water. In some cases, the stained portion of fabric is additionally scrubbed by hand while holding it under water.

Embodiments of the rinsable ink compositions of the present invention are rinsable from surfaces (e.g., a person's skin, cotton fabric, floors, walls and/or furniture) by applying only water, without the use of a surfactant (e.g., soap) or any other type of cleaning agent. An ink composition is "rinsable" if it can be entirely removed (i.e., is "entirely rinsable"), or substantially removed (i.e., is "substantially rinsable"), from the surface. The composition has been entirely removed from the surface if, after applying only water (e.g., after holding cotton fabric under running water, wiping the cotton fabric with a wet sponge, or submerging the cotton fabric in water, and in some cases after additionally scrubbing the "stained" portion of fabric by hand), the ink (e.g., a stain created by the ink) is no longer visible at all on the surface. The composition has been substantially removed from a surface if, after applying only water, the vast majority of the ink has been removed so that the ink (e.g., a stain created by the ink) is only slightly visible on the surface (i.e., only a very light, faded residue from the ink is still visible on a fabric surface). According to certain embodiments, for example, the ink composition is either entirely rinsable or substantially rinsable from cotton fabric. According to preferred embodiments, the ink composition is entirely rinsable from cotton fabric. It is also contemplated that the ink composition is easily washable and/or rinsable from a person's skin and/or from solid surfaces, such as floors, walls, or furniture.

As used herein, "cotton fabric" is preferably fabric that consists of 100% cotton. For example, the cotton fabric may comprise an item of clothing or an accessory that is 100% cotton, such as a shirt (e.g., a t-shirt), pair of pants, skirt, dress, sock, undergarment, hat, glove, jacket, or handbag. The fabric may alternatively be another type of article, such as a household item (e.g., a tablecloth or drapes). Cotton fabric may alternatively comprise a blend of cotton with another type of natural or synthetic fabric, such as nylon, polyester, rayon, silk, wool, or blends thereof (e.g., a blend of 50% cotton and 50% polyester, or 60% cotton and 40% polyester). As used herein, "fabric" (which is interchangeable with the term "cloth") comprises, consists essentially of, or consists of strands of natural and/or synthetic fibers (e.g., yarn and/or thread) that have been woven together (such as by weaving or knitting) so that they are interlaced.

According to an embodiment of the present invention, the rinsable ink composition comprises, consists essentially of, or consists of water; one or more sugars; one or more dyes; one or more optional dye blockers; and one or more optional additives. Non-limiting examples of the one or more sugars include monosaccharides, oligosaccharides, and polysaccharides, such as glucose, fructose, galactose, sucrose, maltose, lactose, cellulose, starch, dextrans, and dextrins (e.g., maltodextrins, cyclodextrins, etc.). According to preferred embodiments, the one or more sugars comprise, consist essentially of, or consist of one or more dextrans and/or one or more dextrins. According to one embodiment of the present invention, the rinsable ink composition comprises, consists essentially of, or consists of water; one or more sugars selected from the group consisting of dextrans and dextrins; one or more dyes; one or more optional dye blockers; and one or more optional additives.

It has been observed according to particular embodiments that the one or more sugars (e.g., the one or more dextrins) not only enhance the rinsability and washability of the ink compositions, they also provide enhanced color vibrancy (brightness) and substantially (or entirely) prevent or inhibit the ink compositions from bleeding through paper substrates (e.g., the sugar(s) help the ink composition remain substantially on the surface of the paper to which it was applied, and prevent or inhibit the ink composition from soaking through the piece of paper to the other side). Without being bound to any theory, it is believed that the one or more sugars (e.g., the one or more dextrins, such as cyclodextrins) may provide enhanced removability from surfaces in primarily one or two of the following ways. The sugar may act as a sheath that envelopes the dye, i.e., the dyes associate or intercalate into the sugar, becoming entangled (as opposed to bonded, e.g., covalently bonded, which would significantly alter the dye's hue) in the sugar; thus, the dyes are effectively "anchored" by the sugar. The sugar may also act as a film former with intrinsically higher surface tension. Even without the incorporation of dye(s), the sugar (in solution) maintains a relatively high surface tension and forms a resulting film on top of the surface on which it resides, further enhancing the removability of any incorporated color.

According to an embodiment of the present invention, the rinsable ink composition comprises, consists essentially of, or consists of about 70 wt % to about 95 wt % water, about 5 wt % to about 35 wt % one or more sugars, about 1 wt % to about 40 wt % one or more optional dye blockers, about 0.1 wt % to about 15 wt % one or more dyes (e.g., one or more acid dyes), and one or more optional additives. For example, the rinsable ink composition may comprise, consist essentially of, or consist of about 70 wt % to about 85 wt % water, about 10 wt % to about 30 wt % one or more sugars, about 5 wt % to about 35 wt % one or more optional dye blockers, about 0.5 wt % to about 10 wt % one or more dyes (e.g., one or more acid dyes), and one or more optional additives. According to particular embodiments, the one or more sugars are selected from the group consisting of dextrans and dextrins.

Cyclodextrins (sometimes called cycloamyloses) are cyclic oligosaccharides that contain glucose units, i.e., ($\alpha$-1, 4)-linked $\alpha$-D-glucopyranose units, bound together in a ring. Cyclodextrins are typically produced from starch by means of enzymatic conversion. Typical cyclodextrins contain a number of glucose monomers ranging from six to eight units in a ring, creating a cone or hollow stopper shape; for example, $\alpha$ (alpha)-cyclodextrin comprises a 6-membered sugar ring molecule, $\beta$ (beta)-cyclodextrin comprises a 7-membered sugar ring molecule; and $\gamma$ (gamma)-cyclodextrin comprises an 8-membered sugar ring molecule. The cyclodextrins suitable for the compositions of the present invention can, if desired, be modified by the addition of substituents. As used herein, "cyclodextrins" include both modified and unmodified cyclodextrins. Substituents generally replace either the entire hydroxyl group or the hydrogen atom on one or more of the hydroxyl groups of the cyclodextrin ring. Non-limiting examples include hydroxypropyl $\beta$-cyclodextrin, methyl $\beta$-cyclodextrin, and sulfobutyl ether $\beta$-cyclodextrin.

FIG. 1 illustrates the structure of one example of a suitable cyclodextrin compound for use in the compositions of the present invention. The outer edges of both open ends are relatively polar and the inside surface is relatively nonpolar. In accordance with the present invention, it is believed that either one surface or both surfaces (inside and outside) of the ringed cyclodextrin interact with portions of the dye molecule, depending on the shape and structure of the dye molecule. Some dye molecules have a linear nonpolar portion which may extend into (and in some cases through) the cyclodextrin, whereas other dyes have wide, flat moieties that may not extend into the cyclodextrin, so they tend to interact with the polar, outer most portions of the cyclodextrin.

The one or more cyclodextrins in embodiments of the ink composition of the present invention may be selected from the group consisting of one or more $\alpha$-cyclodextrins, one or more $\beta$-cyclodextrins, one or more $\gamma$-cyclodextrins, and mixtures thereof. According to preferred embodiments, the one or morecyclodextrins comprise, consist essentially of, or consist of one or more $\beta$-cyclodextrins. In many cases, the $\beta$-cyclodextrins demonstrate better solubility in the aqueous compositions of the present invention, and generally associate better with certain dye(s), particularly acid dyes (e.g., acid blue 9 (Color Index (C.I.) 42090; CAS number 3844-45-9), acid red 52 (CAS number 3520-42-1), acid red 18 (C.I. 16255; CAS number 2611-82-7), acid yellow 17 (C.I. 18965; CAS number 6359-98-4), acid yellow 23 (C.I. 19140; CAS number 1934-21-0), acid yellow 36 (C.I. 13065; CAS number 587-98-4), or FD&C Yellow 6 (C.I. 15985; CAS number 2783-94-0)), compared to a-cyclodextrins and y-cyclodextrins. This is possibly due to the sizes and morphologies of both the dye(s) and $\beta$-cyclodextrins.

According to particular embodiments, the one or more cyclodextrins are selected from the group consisting of hydroxypropyl $\beta$-cyclodextrin, methyl $\beta$-cyclodextrin, sulfobutyl ether $\beta$-cyclodextrin, and combinations thereof. Preferably, the one or more cyclodextrins are selected such that the composition has the same color brightness, or greater color brightness, compared to the dye(s) alone, particularly acid dyes (e.g., acid blue 9 (Color Index (C.I.) 42090; CAS number 3844-45-9), acid red 52 (CAS number 3520-42-1), acid red 18 (C.I. 16255; CAS number 2611-82-7), acid yellow 17 (C.I. 18965; CAS number 6359-98-4), acid yellow 23 (C.I. 19140; CAS number 1934-21-0), acid yellow 36 (C.I. 13065; CAS number 587-98-4), or FD&C Yellow 6 (C.I. 15985; CAS number 2783-94-0). It is believed that this occurs when the cyclodextrin associates with the dye(s) in such a way that the color brightness of the dye is retained or enhanced, i.e., the cyclodextrin does not bind the dye(s) in such a way that it causes the color of the dye(s) to become hidden or muted in the final composition. In an exemplary embodiment, the one or more cyclodextrins comprise, consist essentially of, or consist of hydroxypropyl β-cyclodextrin (e.g., CAVASOL® W7 HP, Wacker Chemie). Any cyclodextrin readily ascertainable by those skilled in the art may be suitable for use in the ink compositions of the present invention, preferably as long as the ink demonstrates enhanced rinsability and/or washability, and/or the same or greater color brightness as the dye(s) alone, as described herein. According to particular embodiments, the one or more cyclodextrins are present in amounts ranging from about 5 wt % to about 35 wt %.

According to an embodiment of the present invention, the rinsable ink composition comprises, consists essentially of, or consists of about 70 wt % to about 95 wt % water, about 5 wt % to about 35 wt % one or more dextrins (e.g., cyclodextrins), about 1 wt % to about 40 wt % one or more optional dye blockers, about 0.1 wt % to about 15 wt % one or more dyes (e.g., one or more acid dyes), and one or more optional additives. For example, the rinsable ink composition may comprise, consist essentially of, or consist of about 70 wt % to about 85 wt % water, about 10 wt % to about 30 wt % one or more dextrins (e.g., cyclodextrins), about 5 wt % to about 35 wt % one or more optional dye blockers, about 0.5 wt % to about 10 wt % one or more dyes (e.g., one or more acid dyes), and one or more optional additives. As used herein, a weight percentage (wt %) refers to a weight percentage of the composition, with the "composition" referring to all of the components in the total composition, including any components that are premixed prior to being combined with the rest of the components.

According to particular embodiments, the rinsable ink composition comprises one or more surfactants. Surfactants may be used to lower the surface tension of the ink composition. Any surfactant readily ascertainable by those skilled in the art may be suitable for use in the ink compositions of the present invention. Examples of suitable surfactants include non-ionic surfactants, such as Dynol 604® and Triton® x-405. An additional example of a surfactant that may be used to adjust surface tension is Silwet® L-77. According to particular embodiments, the one or more surfactants are present in the composition in an amount of about 0.01 wt % to about 2 wt %, or about 0.05 wt % to about 0.5 wt %.

According to one embodiment, the rinsable ink composition comprises, consists essentially of, or consists of about 70 wt % to about 95 wt % water (e.g., about 70 wt % to about 85 wt % water), about 5 wt % to about 35 wt % one or more dextrins (e.g., about 10 wt % to about 30 wt % one or more cyclodextrins), about 1 wt % to about 40 wt % one or more optional dye blockers (e.g., about 5 wt % to about 35 wt % one or more optional dye blockers); about 0.1 wt % to about 15 wt % one or more dyes (e.g., about 0.5 wt % to about 10 wt % one or more dyes), about 0.01 wt % to about 2 wt % one or more optional surfactants (e.g., about 0.05 wt % to about 0.5 wt %), and one or more optional additives (e.g., one or more preservatives). Preferably, the liquid vehicle of the present invention includes only water, and does not include any organic components, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, alcohol derivatives, carbitol, butyl carbitol, cellusolve, ether derivatives, amino alcohols, ketones, etc.

The one or more dyes in rinsable ink compositions of the present invention may comprise acid dye(s), direct dye(s), basic dye(s), solvent based dye(s), etc. Preferably, the dye(s) are water soluble, or substantially water soluble. The one or more dyes preferably comprise, consists essentially of, or consist of one or more acid dyes (e.g., Acid Red 18). Generally, acid dyes have functional groups such as azo, triaryl methane, or anthraquinone that include acid substituents, such as nitro, carboxy or sulfonic acid groups. Any acid dye readily ascertainable by those skilled in the art, in any color, pH, etc. may be suitable for use in the ink compositions of the present invention, preferably as long as the ink demonstrates enhanced rinsability and/or washability, and/or the same or greater color brightness as the dye(s) alone, as described herein. For example, suitable dyes that are useful in compositions of the present invention include, but are not limited to, acid blue 9 (Color Index (C.I.) 42090; CAS number 3844-45-9), acid red 52 (CAS number 3520-42-1), acid red 18 (C.I. 16255; CAS number 2611-82-7), acid yellow 17 (C.I. 18965; CAS number 6359-98-4), acid yellow 23 (C.I. 19140; CAS number 1934-21-0), acid yellow 36 (C.I. 13065; CAS number 587-98-4), FD&C Yellow 6 (C.I. 15985; CAS number 2783-94-0), acid red 1 (C.I. 18050; CAS number 3734-67-6), and acid red 87 (C.I. 45380; CAS number 17372-87-1). The dye may be added to the composition in any suitable form, such as solid phase or liquid form. Preferably, the dye is added in dry powdered form. According to particular embodiments, one or more dyes are present in amounts ranging from about 0.1 wt % to about 15 wt %.

According to particular embodiments, dye blockers are an additional component of the composition. Any dye blockers readily ascertainable by those skilled in the art may be suitable for use in compositions of the present invention (e.g., those available under the tradenames Milliguard®, Richfix®, or Dow® 2A-1), preferably as long as the ink demonstrates enhanced rinsability and/or washability, and/or the same or greater color brightness as the dye(s) alone, as described herein. Dye blockers may include, for example, sodium octane sulfonate, sodium xylenesulfonate, fatty alcohol ethoxylate, disodium hexadecyldiphenyloxide disulfonate, benzene-1,1-oxybis-tetrapropylene sulfonated sodium, decyl-sulfophenoxy-benzenesulfonic acid-disodium, decyl-sulfophenoxybenzenesulfonicacid disodium, octylphenoxypolyethoxyethanol, sodium salt of naphthalene-formaldehyde condensate, sodium salt of carboxylated polyelectrolyte, sodium lignin sulfonate, polyethoxylated tert-dodecyl sulfur compound, etc. According to particular embodiments, one or more dye blockers are present in amounts ranging from about 1 wt % to about 40 wt %.

According to certain embodiments, compositions of the present invention comprise one or more additional additives. These additives may include, but are not limited to, pH adjusters, humectants, buffers, defoamers, preservatives, dispersing agents, and/or scents. Such additives are readily ascertainable by those skilled in the art and are available from numerous sources. The compositions preferably comprise less than about 2% additives (e.g., between about 0.01 wt % to about 2 wt % additive(s), or between about 0.01 wt % to about 1 wt % additive(s)), more preferably less than about 1 wt % additive(s), most preferably less than about 0.5 wt % additive(s).

In particular embodiments, the compositions of the present invention do not contain any additives. While a pH adjuster, such as citric acid, may be added to compositions of the present invention, the compositions preferably do not contain any added pH adjusters, such as acids (separate from other acidic components present in the composition, such as acid dyes). Thus, the one or more additives may include, but are not limited to, humectants, buffers, defoamers, preservatives, dispersing agents, and/or scents. In one embodiment, the one or more additives comprise, consist essentially of, or consist of one or more preservatives (e.g., anti-microbial agents).

According to preferred embodiments, the compositions of the present invention provide the same or greater amount of color brightness when applied to a substrate as the dye(s) alone (as measured, for example, by a spectrophotometer or other instrument known in the art for quantifying color brightness). Stated another way, an unformulated dye (i.e., alone without any additives) applied to a piece of paper has the same or less brightness on the paper as a composition of the present invention that includes the same dye (e.g., acid blue 9 (Color Index (C.I.) 42090; CAS number 3844-45-9), acid red 52 (CAS number 3520-42-1), acid red 18 (C.I. 16255; CAS number 2611-82-7), acid yellow 17 (C.I. 18965; CAS number 6359-98-4), acid yellow 23 (C.I. 19140; CAS number 1934-21-0), acid yellow 36 (C.I. 13065; CAS number 587-98-4), or FD&C Yellow 6 (C.I. 15985; CAS number 2783-94-0)). This result is surprising, particularly in view of the fact that the color produced by a dye that is mixed with other components of a composition would be expected to be diluted and therefore have less vibrancy and brightness. The result is particularly surprising in embodiments of the present invention that include one or more dye blockers, as dye blockers are typically known to mute an ink's color.

According to another embodiment of the present invention, a rinsable ink composition comprises, consists essentially of, or consists of about 70 wt % to about 95 wt % water; about 5 wt % to about 35 wt % one or more β-cyclodextrins; about 1 wt % to about 40 wt % one or more dye blockers; about 0.1 wt % to about 15 wt % one or more dyes; and one or more optional additives, wherein the composition has the same color brightness, or greater color brightness, as the one or more dyes alone (either before or after the composition or dye(s) have been applied to a substrate, such as paper). According to one embodiment, the one or more dyes are selected from the group consisting of acid blue 9 (Color Index (C.I.) 42090; CAS number 3844-45-9), acid red 52 (CAS number 3520-42-1), acid red 18 (C.I. 16255; CAS number 2611-82-7), acid yellow 17 (C.I. 18965; CAS number 6359-98-4), acid yellow 23 (C.I. 19140; CAS number 1934-21-0), acid yellow 36 (C.I. 13065; CAS number 587-98-4), FD&C Yellow 6 (C.I. 15985; CAS number 2783-94-0), and a combination thereof. Color brightness may be quantified by any suitable method known in the art, for example by spectrophotometry (e.g., an Xrite® spectrophotometer, model SP62). As discussed above, the composition also preferably has enhanced washability and/or rinsability, in addition to the same color brightness, or greater color brightness, as the one or more dyes alone.

The rinsable ink compositions of the present invention can be used to make artistic creations of any kind, particularly when applied to a substrate, such as paper. According to particular embodiments, a rinsable ink composition is contained inside a writing utensil, such as a marker or pen. Alternatively, the rinsable ink composition may be used as a paint. Thus, embodiments of the present invention include a marker, a pen, or a paint that comprises the rinsable ink composition. In exemplary embodiments, a marker comprises the rinsable ink composition. For example, according to one embodiment, a coloring kit comprises a plurality of markers, with each marker comprising a rinsable ink composition. Preferably, the composition contained in each marker is a different color. As used herein, a marker is a writing utensil that has an ink source and a tip made of porous or pressed fibers, such as felt (e.g., a felt-tipped pen). A marker may comprise a container (glass, aluminum or plastic) and a core of an absorbent material such as felt. The core preferably serves as the ink source, i.e., a carrier for the ink. According to particular embodiments, the composition is contained inside a marker, and a lower viscosity (e.g., between about 2 cP to about 4.5 cP) helps promote wicking through a porous marker nib.

The ink compositions of the present invention can be prepared by any suitable process. According to one embodiment, the ink compositions are prepared by mixing the ingredients together in any order (e.g., mixing water, one or more sugars, one or more dye blockers, one or more dyes, and one or more optional additives). According to another embodiment of the present invention, a method for making rinsable ink compositions described herein comprises, consists essentially of, or consists of (a) dissolving one or more sugars (e.g., one or more dextrans and/or one or more dextrins) in water to form a sugar solution (e.g., a "dextran solution," "dextrin solution," "dextran/dextrin solution," or "cyclodextrin solution"); (b) subsequently adding one or more dyes (e.g., one or more acid dyes) to the sugar solution, preferably in the form of a dry powder, to form a sugar-dye solution (e.g., a "dextran-dye solution," "dextrin-dye solution," "dextran/dextrin-dye solution," or "cyclodextrin-dye solution"); and (c) subsequently adding one or more optional dye blockers to the sugar-dye solution. The method is preferably carried out at room temperature (e.g. at about 20° C. to about 30° C., or about 25° C.), without adding heat to the composition. However, heat may optionally be applied to the composition during one or more method steps. In each step, after each component is added, the solution is thoroughly mixed.

For example, according to an embodiment of the present invention, a method for making rinsable ink compositions described herein comprises, consists essentially of, or consists of (a) dissolving one or more cyclodextrins in water to form a cyclodextrin solution; (b) subsequently adding one or more dyes (e.g., one or more acid dyes) to the cyclodextrin solution to form a cyclodextrin-dye solution; and (c) subsequently adding one or more optional dye blockers to the cyclodextrin-dye solution.

By first dissolving the one or more sugars (e.g., cyclodextrins) in water, and then adding the one or more dyes, it is believed that the sugar(s) and dye(s) associate with each other, allowing them to form sugar-dye (e.g., cyclodextrin-dye) complexes. After the one or more optional dye blockers are added, the dye blocker(s) substantially envelop the sugar-dye complexes formed by the dye(s) and sugar(s). The dye-blocker(s) are preferably not added any earlier, so that the dye-blocker(s) do not associate with the dye(s) and prevent the dye(s) from associating with the sugar(s).

According to particular embodiments, the method comprises the step of adding one or more optional additives prior to or subsequent to any of steps (a)-(c). According to preferred embodiments, the one or more optional additives are added subsequent to steps (a)-(c). According to particular embodiments, the method comprises the step of adding one or more surfactants prior to or subsequent to any of steps (a)-(c). According to preferred embodiments, the one or more surfactants are added subsequent to steps (a)-(c). According to one embodiment, a method for making a rinsable ink composition comprises, consists essentially of, or consists of (a) dissolving one or more sugars (e.g., cyclodextrins) in water to form a sugar solution (e.g., a cyclodextrin solution); (b) subsequently adding one or more dyes (e.g., one or more acid dyes) to the sugar solution to form a sugar-dye solution; (c) subsequently adding one or more optional dye blockers to the sugar-dye solution; (d) adding one or more optional surfactants (e.g., subsequent to steps (a)-(c)); and (e) adding one or more optional additives, e.g., one or more preservatives (e.g., subsequent to steps (a)-(c)).

According to another embodiment of the present invention, the rinsable ink compositions of the present invention may be used on a rinsable substrate, such as a fabric-based substrate. The rinsable substrate is resistant to inks soaking through the surface of the substrate. For example, the substrate may be coated with a protective material, such as an acrylic coating, that prevents or inhibits ink from soaking through the surface and into the fabric of the substrate. The substrate may comprise, for example, a canvas (e.g., a Fredrix® brand canvas by Tara Materials Inc.). Due to the enhanced rinsability of the inks described herein, the ink can be applied to the substrate and then cleaned off by simply applying water to the surface of the substrate (e.g., by running the substrate under water, or by wiping the surface with a wet cloth). The substrate (e.g., the rinsable canvas) can then be reused after it has dried. The substrate can preferably be reused multiple times.

According to one embodiment, a kit comprises one or more rinsable ink compositions of the present invention and one or more rinsable substrates (e.g., one or more rinsable canvases). The surface of the substrate preferably comprises a protective coating (e.g., an acrylic coating) that prevents or inhibits ink from soaking through the surface. The substrate may be fabric-based (e.g., it may comprise, consist essentially of, or consist of cotton). The rinsable ink composition(s) may be provided inside one or more containers for use as paint (e.g., with a different color ink inside each container), or may alternatively be contained inside one or more markers. The kit may further comprise one or more ink applicators, such as paintbrushes.

According to another embodiment, a method of using a rinsable ink composition of the present invention comprises applying the composition to a rinsable substrate comprising a protective coating as described above (e.g., a rinsable canvas). For example, a paint brush may be used to apply the composition to the rinsable substrate. The ink may then be rinsed off by applying water, and may be subsequently re-used one or more times.

The following examples are provided to describe the invention in greater detail and are intended to illustrate, not limit, the invention.

EXAMPLE

Example 1

Sample Composition

The composition disclosed in Table 1 below was made by first dissolving the cyclodextrin in water to form a cyclodextrin solution, subsequently adding the acid dyes to the cyclodextrin solution to form a cyclodextrin-acid dye solution, subsequently adding the dye blockers to the cyclodextrin-acid dye solution, and subsequently adding the surfactants.

TABLE 1

| Component | Weight Percentage |
|---|---|
| Water | 73.5-84.45 |
| Hydroxypropyl beta cyclodextrin | 10-30 |
| Acid dye | 0.5-8 |
| Milliguard ®/Richfix ®/Dow ® 2A-1 (all "dye blockers") | 5-35 |
| Dynol 604 ®/Triton ® x-405 (surfactants) | 0.05-5 |
| Total | 100.0 |

Example 2

Stain Assessment

Table 2 below summarizes a stain assessment study that was conducted on different combinations of dyes and cyclodextrins. Each formulation in the table included 1% dye, 1% surfactant (Dynol® 604), 40% cyclodextrin (where applicable), and a balance of deionized water.

TABLE 2

| Dye | Cyclodextrin | Hand* | Fabric** | Wall*** |
|---|---|---|---|---|
| Basic Blue 1 | none | 3.00 | 24.50 | 19.25 |
| | methyl-b-cyclodextrin | 0.50 | 71.00 | 82.25 |
| | hydroxypropyl-b-cyclodextrin | 0.50 | 67.43 | 71.98 |
| | sulfobutyl ether cyclodextrin | 0.50 | 94.50 | 93.20 |
| Basic Red 15 | none | 4.00 | 29.05 | 45.76 |
| | methyl-b-cyclodextrin | 1.00 | 53.92 | 71.65 |
| | hydroxypropyl-b-cyclodextrin | 1.50 | 45.69 | 73.56 |
| | sulfobutyl ether cyclodextrin | 1.00 | 71.75 | 71.19 |
| Solvent Black 46 | none | 3.00 | 57.37 | 1.61 |
| | methyl-b-cyclodextrin | 0.00 | 78.87 | 63.95 |
| | hydroxypropyl-b-cyclodextrin | 0.50 | 64.98 | 67.04 |
| | sulfobutyl ether cyclodextrin | 0.50 | 90.36 | 92.23 |
| Solvent Red AY4620 | none | 2.00 | 70.03 | 1.29 |
| | methyl-b-cyclodextrin | 0.50 | 97.18 | 95.23 |
| | hydroxypropyl-b-cyclodextrin | 0.50 | 96.85 | 96.71 |
| | sulfobutyl ether cyclodextrin | 1.00 | 97.79 | 89.38 |
| Direct Blue 106 | none | 3.00 | 52.79 | 92.73 |
| | methyl-b-cyclodextrin | 0.50 | 78.11 | 98.14 |
| | hydroxypropyl-b-cyclodextrin | 1.00 | 79.27 | 98.37 |
| | sulfobutyl ether cyclodextrin | 0.00 | 85.20 | 98.37 |
| Direct Yellow 4 | none | 1.00 | 25.18 | 73.15 |
| | methyl-b-cyclodextrin | 0.00 | 86.48 | 99.31 |
| | hydroxypropyl-b-cyclodextrin | 0.00 | 77.61 | 99.76 |
| | sulfobutyl ether cyclodextrin | 0.50 | 65.07 | 99.86 |

TABLE 2-continued

| Dye | Cyclodextrin | Hand* | Fabric** | Wall*** |
|---|---|---|---|---|
| Acid Blue 9 | none | 1.00 | 93.61 | 89.92 |
| | methyl-b-cyclodextrin | 0.50 | 95.98 | 99.26 |
| | hydroxypropyl-b-cyclodextrin | 0.50 | 95.67 | 98.95 |
| | sulfobutyl ether cyclodextrin | 0.50 | 95.78 | 99.21 |

*To measure stain removal from a hand - two layers of ink from a marker were applied in a 1 inch stripe on a palm, 15 minute dry, 30 second warm water rinse; visual evaluation of skin: remaining stain after rinse recorded - 0 = complete removal of stain, 5 = no removal.
**To measure stain removal from fabric - a 1 × 1.5 inch ink stain was applied on a 100% cotton swatch (ink deposit between 0.05-0.06 grams); Xrite ® spectrophotometer (model SP62) was used to read delta E after a cold/cold machine wash with Tide ® powder detergent (4 lb ballast load, 100 g detergent).
***To measure stain removal from a wall - a 1 × 1.5 inch ink stain was applied to prepared drywall (drywall prep: 1 coat Kilz white wall primer; followed by two coats Behr Eggshell White); delta E Xrite ® values were recorded after 1 minute warm water soak/wipe with paper towel.

Although the present invention has been described in connection with specific embodiments, it should be understood that the invention as claimed should not be unduly limited to such specific embodiments. Indeed, various modifications and variations of the described compositions and methods of the invention will be apparent to those of ordinary skill in the art and are intended to be within the scope of the appended claims.

What is claimed is:

1. A rinsable ink composition comprising:
   about 70 wt % to about 95 wt % water;
   about 5 wt % to about 35 wt % one or more cyclodextrins;
   about 1 wt % to about 40 wt % one or more dye blockers;
   about 0.1 wt % to about 15 wt % one or more dyes; and
   one or more optional additives,
   wherein the composition is rinsable from a surface by applying only water.

2. The rinsable ink composition of claim 1, wherein the one or more cyclodextrins are β-cyclodextrins.

3. The rinsable ink composition of claim 1, wherein the one or more dyes comprise acid dyes.

4. The rinsable ink composition of claim 1, wherein the one or more cyclodextrins are selected from the group consisting of hydroxypropyl β-cyclodextrin, methyl β-cyclodextrin, sulfobutyl ether β-cyclodextrin, and combinations thereof.

5. A marker comprising the rinsable ink composition of claim 1.

6. A pen comprising the rinsable ink composition of claim 1.

7. A paint comprising the rinsable ink composition of claim 1.

8. A method for making a rinsable ink composition comprising:
   (a) dissolving one or more cyclodextrins in water to form a cyclodextrin solution;
   (b) subsequently adding one or more dyes to the cyclodextrin solution to form a cyclodextrin-dye solution;
   (c) subsequently adding one or more dye blockers to the cyclodextrin-dye solution; and
   (d) adding one or more optional additives prior to or subsequent to any of steps (a)-(c).

9. The method according to claim 8, further comprising adding one or more surfactants.

10. The method according to claim 9, comprising adding the one or more surfactants subsequent to steps (a)-(c).

11. The method according to claim 8, comprising adding the one or more optional additives subsequent to steps (a)-(c).

12. The method according to claim 8, wherein the composition is rinsable from cotton fabric by applying only water.

13. The method according to claim 8, wherein the rinsable ink composition comprises:
   about 70 wt % to about 95 wt % of the water;
   about 5 wt % to about 35 wt % of the one or more cyclodextrins;
   about 1 wt % to about 40 wt % of the one or more dye blockers; and
   about 0.1 wt % to about 15 wt % of the one or more dyes.

14. The method according to claim 13, wherein the one or more dyes comprise acid dyes.

15. A method of using a rinsable ink composition of claim 1 comprising applying the composition to a rinsable substrate.

16. The method according to claim 15, wherein the rinsable substrate is a fabric-based canvas comprising a protective coating.

17. The method according to claim 15, comprising applying the composition to the rinsable substrate with a paintbrush.

18. A rinsable ink composition comprising:
   about 70 wt % to about 95 wt % water;
   about 5 wt % to about 35 wt % one or more β-cyclodextrins;
   about 1 wt % to about 40 wt % one or more dye blockers;
   about 0.1 wt % to about 15 wt % one or more dyes; and
   one or more optional additives,
   wherein the composition is rinsable from a surface by applying only water, and
   wherein the composition has the same color brightness, or greater color brightness, as the one or more dyes alone, as measured by spectrophotometry.

19. The rinsable ink composition of claim 18, wherein the one or more β-cyclodextrins are selected from the group consisting of hydroxypropyl β-cyclodextrin, methyl β-cyclodextrin, sulfobutyl ether β-cyclodextrin, and combinations thereof.

* * * * *